US011405987B2

(12) United States Patent
    Liu

(10) Patent No.: US 11,405,987 B2
(45) Date of Patent: Aug. 2, 2022

(54) ELECTRONIC CIGARETTE WITH AN E-LIQUID INLET THAT IS RELIABLY SEALED

(71) Applicant: Tuanfang Liu, Shenzhen (CN)

(72) Inventor: Tuanfang Liu, Shenzhen (CN)

( * ) Notice: Subject to any disclaimer, the term of this patent is extended or adjusted under 35 U.S.C. 154(b) by 766 days.

(21) Appl. No.: 16/371,096

(22) Filed: Mar. 31, 2019

(65) Prior Publication Data
    US 2020/0178613 A1     Jun. 11, 2020

(30) Foreign Application Priority Data

Dec. 10, 2018 (CN) .......................... 201811501116.8
Dec. 10, 2018 (CN) .......................... 201822059326.8

(51) Int. Cl.
| | | |
|---|---|---|
| *H05B 3/46* | (2006.01) | |
| *A24F 7/02* | (2006.01) | |
| *F16J 15/02* | (2006.01) | |
| *H05B 1/02* | (2006.01) | |
| *H05B 3/03* | (2006.01) | |
| *A24F 40/46* | (2020.01) | |
| *H05B 3/42* | (2006.01) | |
| *H05B 3/40* | (2006.01) | |
| *H05B 3/00* | (2006.01) | |
| *A24F 40/40* | (2020.01) | |
| *A24F 40/485* | (2020.01) | |
| *A24F 7/00* | (2006.01) | |
| *A24F 15/015* | (2020.01) | |

(52) U.S. Cl.
    CPC ................ *H05B 3/46* (2013.01); *A24F 7/02* (2013.01); *A24F 40/46* (2020.01); *F16J 15/022* (2013.01); *H05B 1/0297* (2013.01); *H05B 3/03* (2013.01); *A24F 7/00* (2013.01); *A24F 15/015* (2020.01); *A24F 40/40* (2020.01); *A24F 40/485* (2020.01); *H05B 3/00* (2013.01); *H05B 3/40* (2013.01); *H05B 3/42* (2013.01)

(58) Field of Classification Search
    CPC .......... H05B 3/46; H05B 1/0297; H05B 3/03; H05B 3/00; H05B 3/40; H05B 3/42; A24F 7/02; A24F 40/46; A24F 40/40; A24F 7/00; A24F 15/015; A24F 40/485; F16J 15/022
    See application file for complete search history.

(56) References Cited

FOREIGN PATENT DOCUMENTS

| | | | | |
|---|---|---|---|---|
| WO | WO-2019038521 A1 | * | 2/2019 | .............. A24F 40/10 |
| WO | WO-2020030792 A1 | * | 2/2020 | .............. A24F 40/10 |

* cited by examiner

*Primary Examiner* — Abdullah A Riyami
*Assistant Examiner* — Justin M Kratt
(74) *Attorney, Agent, or Firm* — Matthias Scholl P.C.; Matthias Scholl

(57) ABSTRACT

An electronic cigarette, including a mouthpiece assembly, an atomizing assembly, and a battery assembly. The mouthpiece assembly is disposed on the atomizing assembly. The atomizing assembly is disposed in the battery assembly. The mouthpiece assembly includes a mouthpiece and a mouthpiece cap covering the mouthpiece. The atomizing assembly includes a limit cover, a heating wire, a silicone support, and joints. The battery assembly includes a rotatable cover, a silicone seal, a seal ring, a cartridge, a silicone connector, a battery cell, a pneumatic switch, a silicone base, and a base sleeve.

2 Claims, 6 Drawing Sheets

ELECTRONIC CIGARETTE WITH AN E-LIQUID INLET THAT IS RELIABLY SEALED

CROSS-REFERENCE TO RELAYED APPLICATIONS

Pursuant to 35 U.S.C. § 119 and the Paris Convention Treaty, this application claims foreign priority to Chinese Patent Application No. 201811501116.8 filed Dec. 10, 2018, and to Chinese Patent Application No. 201822059326.8 filed Dec. 10, 2018. The contents of all of the aforementioned applications, including any intervening amendments thereto, are incorporated herein by reference. Inquiries from the public to applicants or assignees concerning this document or the related applications should be directed to: Matthias Scholl PC., Attn.: Dr. Matthias Scholl Esq., 245 First Street, 18th Floor, Cambridge, Mass. 02142.

BACKGROUND

This disclosure relates to an electronic cigarette.

Electronic cigarettes atomize nicotine-containing e-liquid.

Conventionally, the e-liquid inlet of electronic cigarettes is sealed by a plug that tends to fall out. In addition, conventional e-cigarettes contain a pneumatic switch and a e-liquid tank which are vertically aligned, and when the e-liquid leaks, the pneumatic switch fails to work.

SUMMARY

The disclosure provides an electronic cigarette which comprises an e-liquid inlet that is reliably sealed.

Provided is an electronic cigarette, comprising a mouthpiece assembly, an atomizing assembly, and a battery assembly. The mouthpiece assembly is disposed on the atomizing assembly. The atomizing assembly is disposed in the battery assembly.

The mouthpiece assembly comprises a mouthpiece and a mouthpiece cap covering the mouthpiece.

The atomizing assembly comprises a limit cover, a heating wire, a silicone support, and joints.

The battery assembly comprises a rotatable cover, a silicone seal, a seal ring, a cartridge, a silicone connector, a battery cell, a pneumatic switch, a silicone base, and a base sleeve.

The heating wire is disposed in the silicone support; the silicone support comprises a bottom end which is provided with two holes; the joints are inserted in the two holes, and two pins of the heating wire are fixed in the silicone support via the two joints; the silicone support is disposed in the limit cover; the silicone connector is disposed in the cartridge, and is connected to and fixes the atomizing assembly; the pneumatic switch is disposed in the silicone base, and positive and negative electrodes of the pneumatic switch are connected to positive and negative electrodes of the battery cell, respectively; the battery cell, the pneumatic switch, and the silicone base are disposed in the cartridge; the cartridge comprises an e-liquid tank and an e-liquid inlet communicating with the e-liquid tank; the rotatable cover is adapted to cover the e-liquid inlet; the base sleeve is sheathed on the cartridge; the cartridge comprises a joint pin adapted to connect to the mouthpiece; the seal ring is sheathed on the joint pin of the cartridge; the silicone seal is disposed on the cartridge; the rotatable cover is rotatably disposed on the cartridge and covers the silicone seal.

The pneumatic switch can be disposed in a first position of the cartridge, the e-liquid tank can be located in a second position of the cartridge, and the first position can be unaligned with the second position vertically.

Advantages of the electronic cigarette according to embodiments of the disclosure are summarized as follows. The pneumatic switch is disposed in a first position of the cartridge, the e-liquid tank is disposed in a second position of the cartridge, and the first position is unaligned with the second position vertically. The rotatable cover can horizontally rotate on the cartridge. When the rotatable cover is pushed to one side, the e-liquid inlet of the cartridge is exposed, and the e-liquid can be injected. After refilling, the rotatable cover is pushed to seal the e-liquid inlet. The electronic cigarette in the disclosure is oval, small-sized, and easy to carry.

DETAILED DESCRIPTION

To further illustrate, embodiments detailing an electronic cigarette are described below. It should be noted that the following embodiments are intended to describe and not to limit the disclosure.

Figure 1:
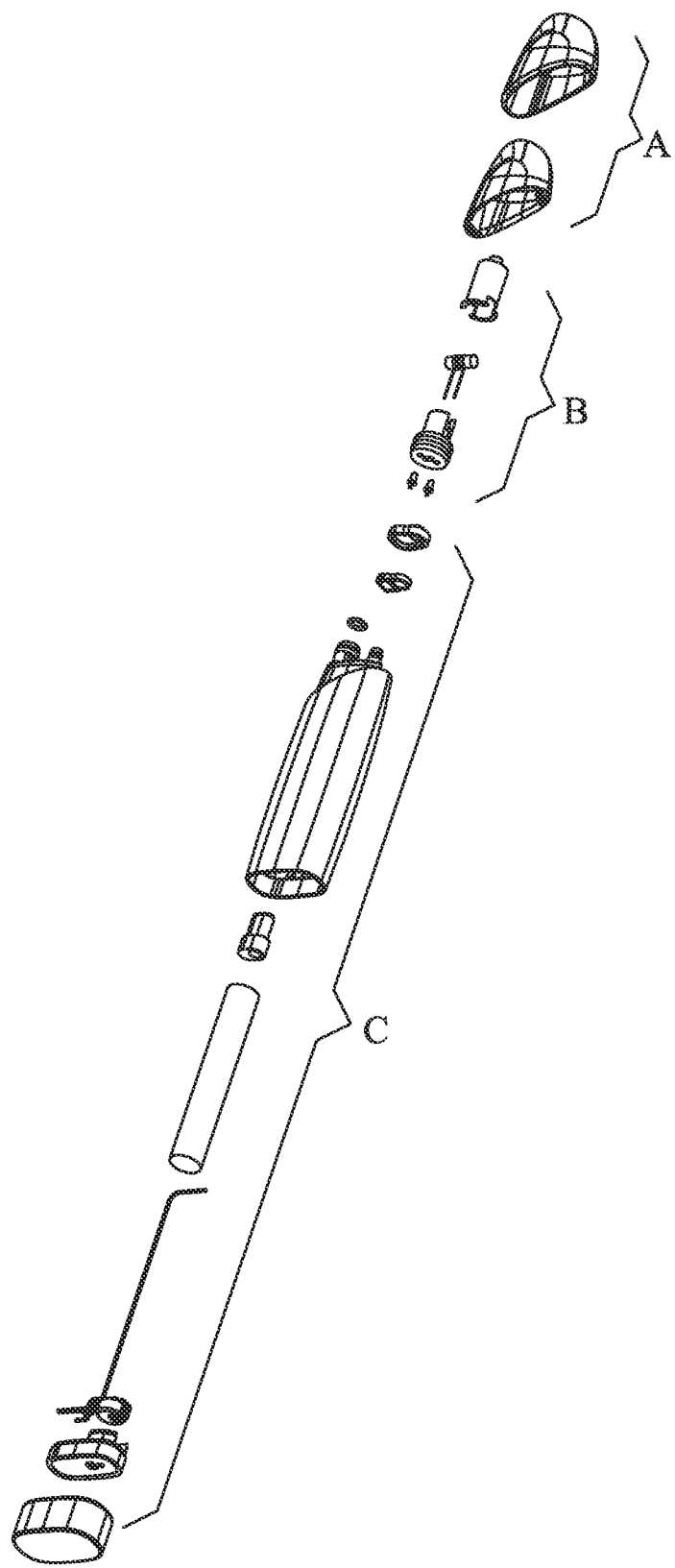
FIG. 1 is an exploded view of an electronic cigarette as described in the disclosure.
Figure 2:
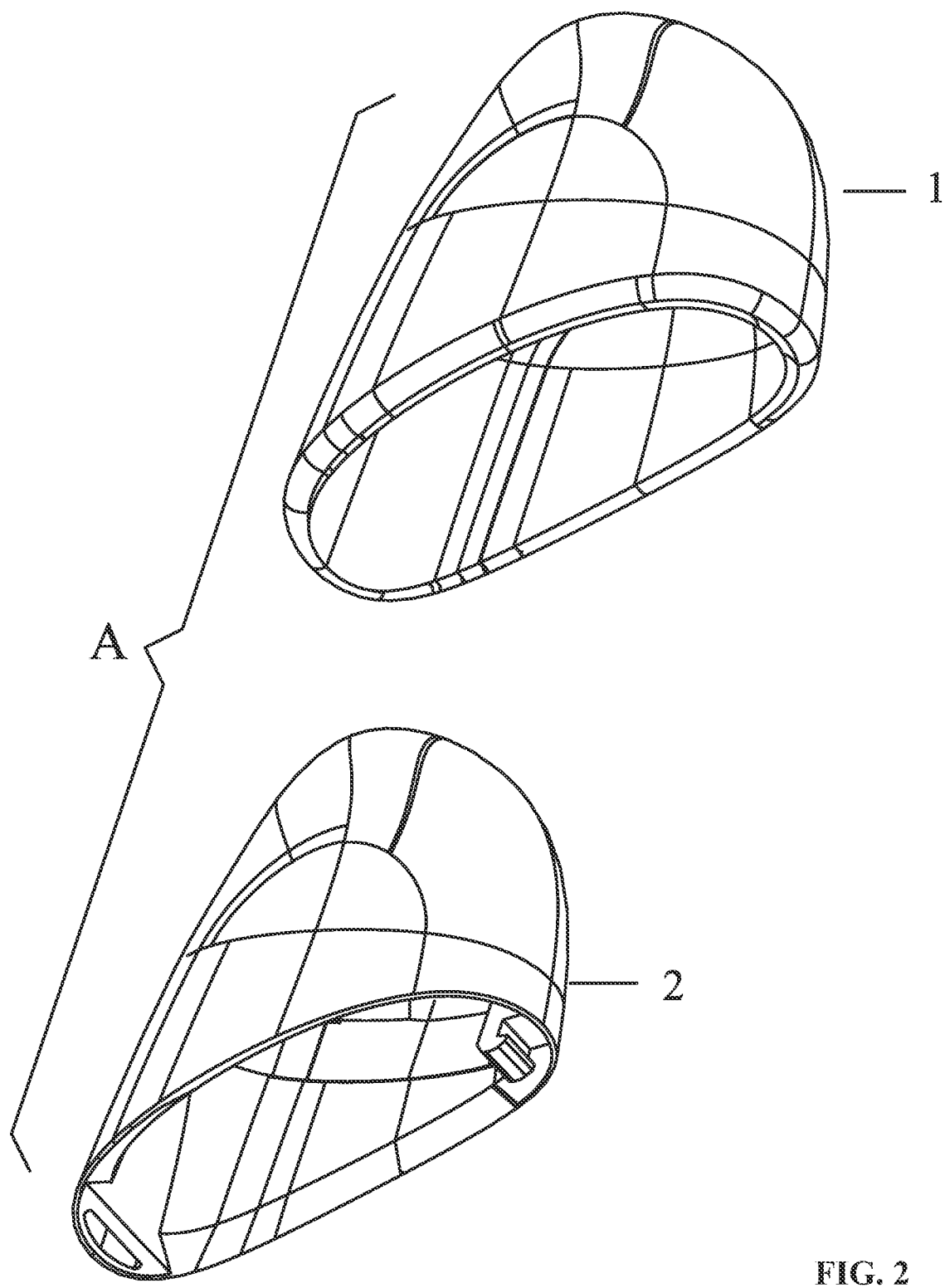
FIG. 2 is an exploded view of a mouthpiece assembly of an electronic cigarette as described in the disclosure
Figure 3:
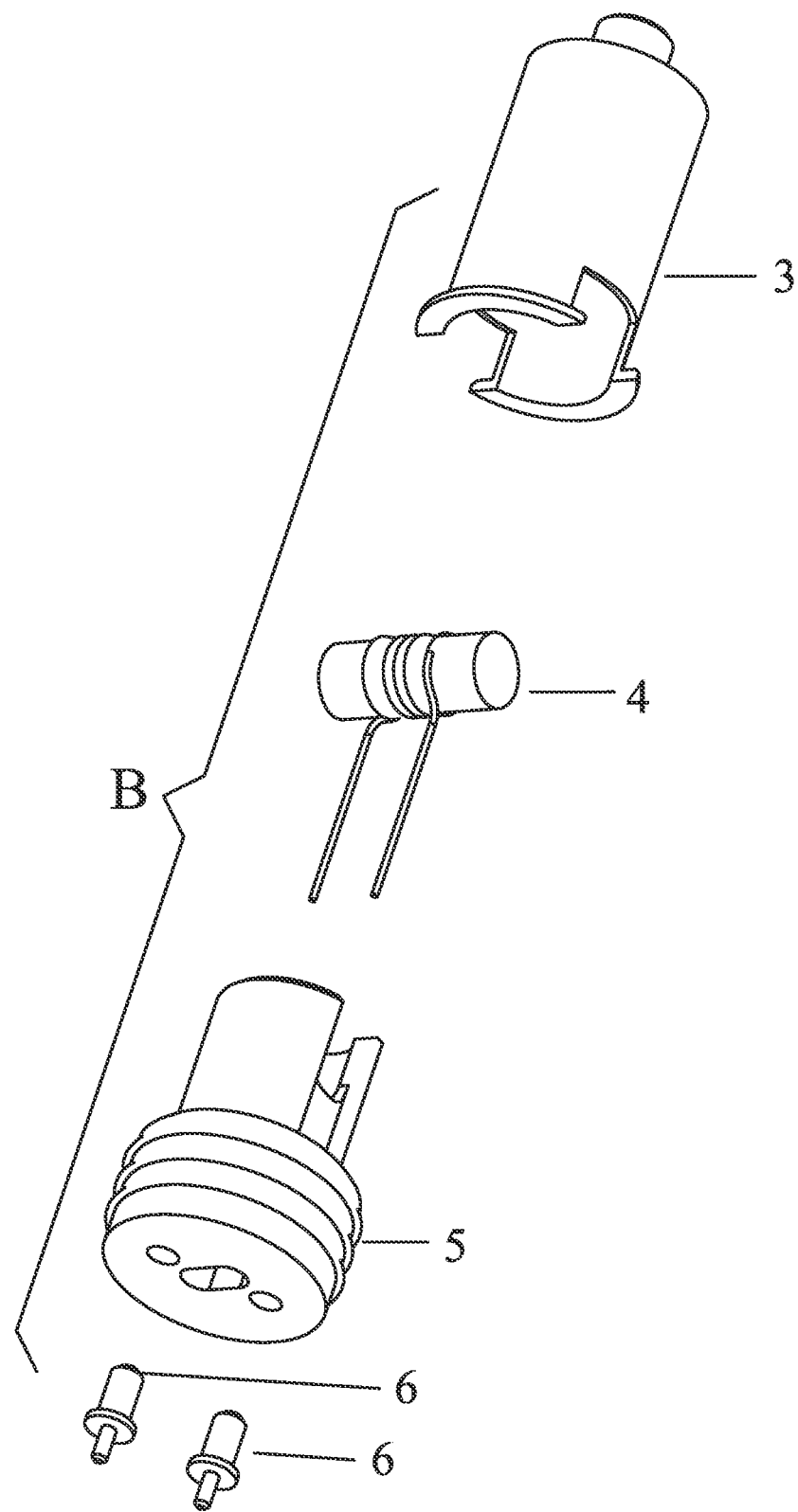
FIG. 3 is an exploded view of an atomizing assembly of an electronic cigarette as described in the disclosure.
Figure 4:
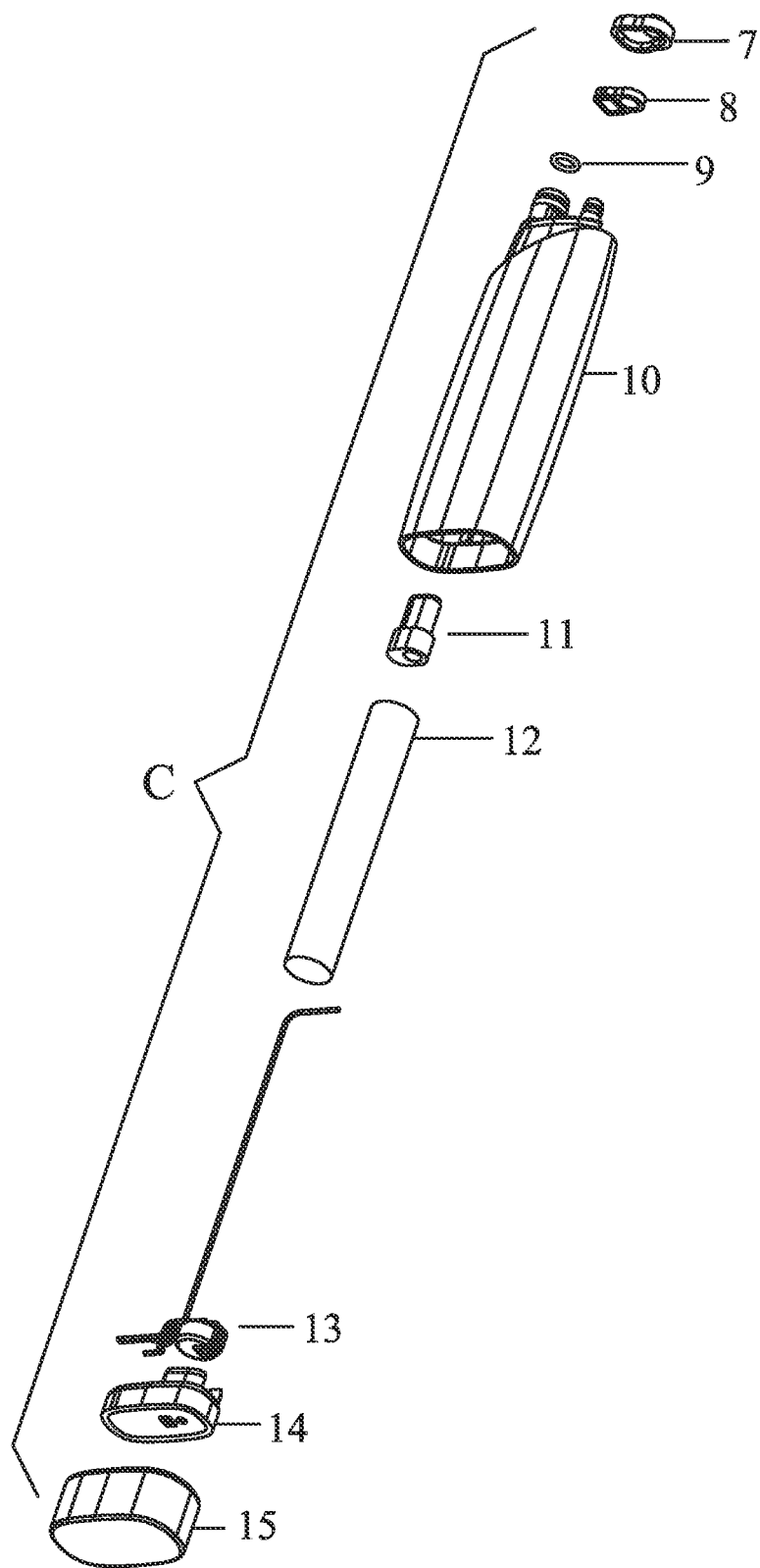
FIG. 4 is an exploded view of a battery assembly of an electronic cigarette as described in the disclosure.
Figure 5:
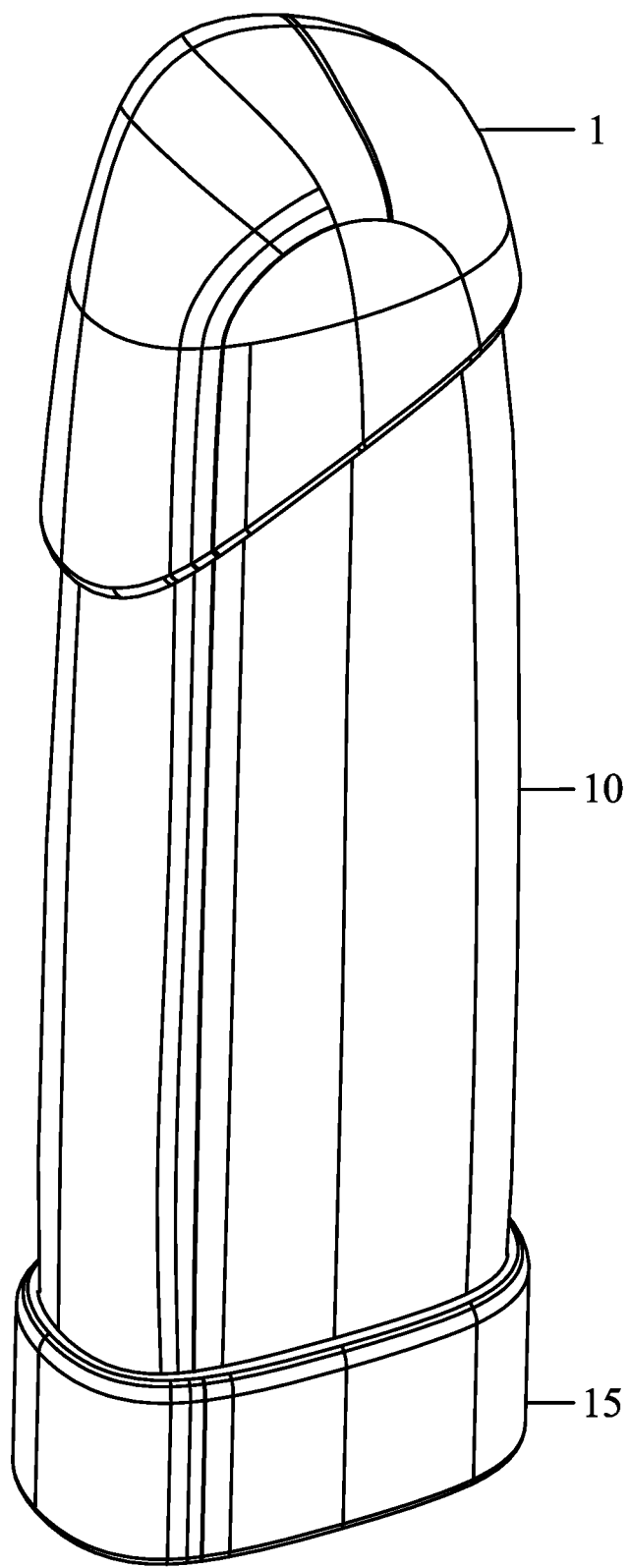
FIG. 5 is a stereogram of an electronic cigarette as described in the disclosure.
Figure 6:
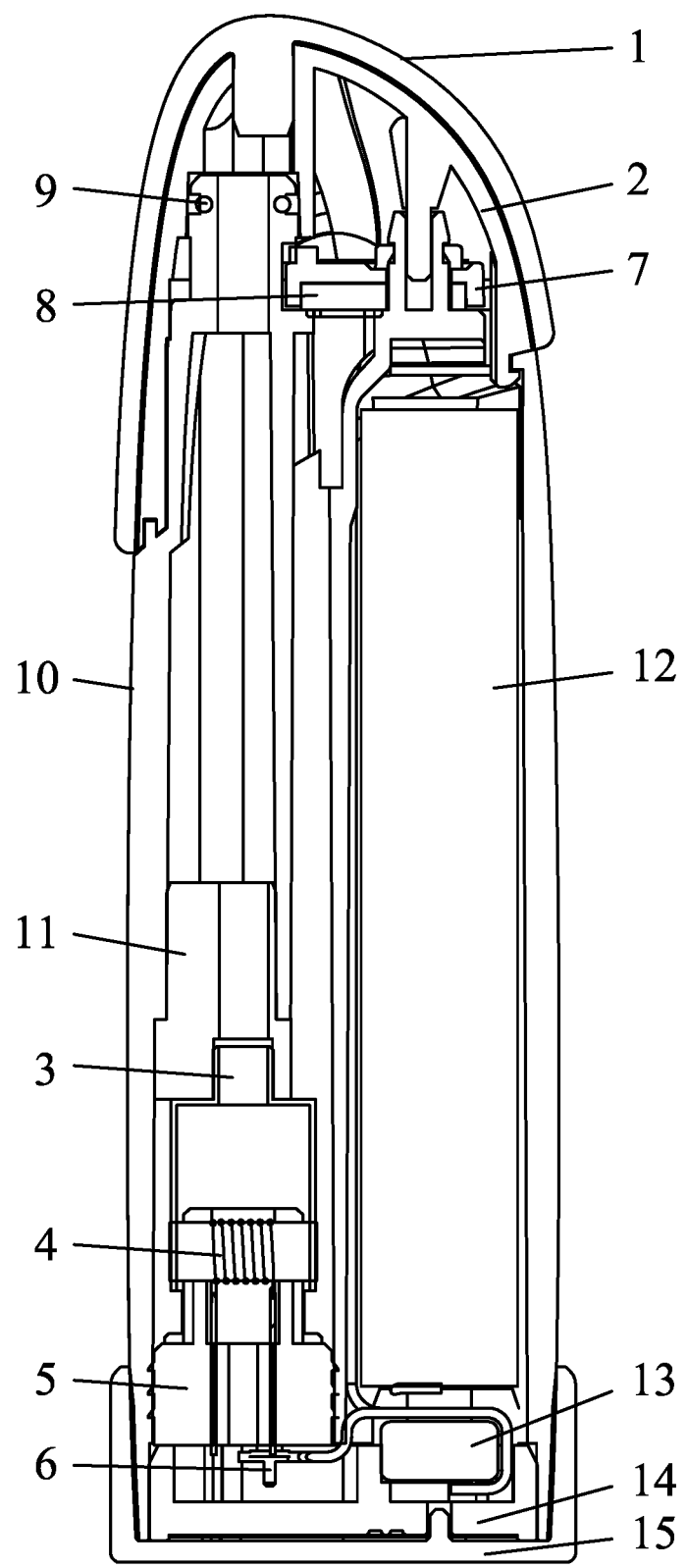
FIG. 6 is a sectional view of an electronic cigarette as described in the disclosure.

As shown in FIGS. 1-6, provided is an electronic cigarette, comprising: a mouthpiece assembly A, an atomizing assembly B, and a battery assembly C. The mouthpiece assembly A is disposed on the atomizing assembly B. The atomizing assembly B is disposed in the battery assembly C.

The mouthpiece assembly A comprises a mouthpiece 2 and a mouthpiece cap 1 covering the mouthpiece 2.

The atomizing assembly B comprises a limit cover 3, a heating wire 4, a silicone support 5, and joints 6. The heating wire 4 is disposed in the silicone support 5; the silicone support 5 comprises a bottom end which is provided with two holes; the joints 6 are inserted in the two holes, and two pins of the heating wire are fixed in the silicone support via the two joints 6; the silicone support 5 is disposed in the limit cover 3.

The battery assembly comprises a rotatable cover 7, a silicone seal 8, a seal ring 9, a cartridge 10, a silicone connector 11, a battery cell 12, a pneumatic switch 13, a silicone base 14, and a base sleeve 15. The silicone connector 11 is disposed in the cartridge 10, and is connected to and fixes the atomizing assembly; the pneumatic switch 13 is disposed in the silicone base 14, and positive and negative electrodes of the pneumatic switch 13 are connected to positive and negative electrodes of the battery cell 12, respectively; the battery cell 12, the pneumatic switch 13, and the silicone base 14 are disposed in the cartridge 10; the cartridge 10 comprises an e-liquid tank and an e-liquid inlet communicating with the e-liquid tank; the rotatable cover 7 is adapted to cover the e-liquid inlet; the base sleeve 15 is sheathed on the cartridge 10; the cartridge comprises a joint pin adapted to connect to the mouthpiece; the seal ring 9 is sheathed on the joint pin of the cartridge 10; the silicone seal 8 is disposed on the cartridge 10; the rotatable cover 7 is rotatably disposed on the cartridge 10 and covers the silicone seal 8.

The pneumatic switch 13 is disposed in a first position of the cartridge 10, the e-liquid tank is disposed in a second position of the cartridge 10, and the first position is unaligned with the second position vertically.

The rotatable cover 7 can horizontally rotate on the cartridge 10. When the rotatable cover 7 is pushed to one side, the e-liquid inlet of the cartridge 10 is exposed and the e-liquid can be injected. After the injection is finished, push the rotatable cover 7 to seal the e-liquid inlet. The electronic cigarette in the disclosure is oval, small-sized and easy to carry.

It will be obvious to those skilled in the art that changes and modifications may be made, and therefore, the aim in the appended claims is to cover all such changes and modifications.

What is claimed is:

1. An electronic cigarette, comprising:
   a mouthpiece assembly, the mouthpiece assembly comprising a mouthpiece and a mouthpiece cap covering the mouthpiece;
   an atomizing assembly, the atomizing assembly comprising a limit cover, a heating wire, a silicone support, and joints; and
   a battery assembly, the battery assembly comprising a rotatable cover, a silicone seal, a seal ring, a cartridge, a silicone connector, a battery cell, a pneumatic switch, a silicone base, and a base sleeve;
   wherein:
   the mouthpiece assembly is disposed on the atomizing assembly;
   the atomizing assembly is disposed in the battery assembly;
   the heating wire is disposed in the silicone support;
   the silicone support comprises a bottom end which is provided with two holes; the joints are inserted in the two holes, and two pins of the heating wire are fixed in the silicone support via the two joints;
   the silicone support is disposed in the limit cover;
   the silicone connector is disposed in the cartridge, and is connected to and fixes the atomizing assembly;
   the pneumatic switch is disposed in the silicone base, and positive and negative electrodes of the pneumatic switch are connected to positive and negative electrodes of the battery cell, respectively; the battery cell, the pneumatic switch, and the silicone base are disposed in the cartridge;
   the cartridge comprises an e-liquid tank and an e-liquid inlet communicating with the e-liquid tank; the rotatable cover is adapted to cover the e-liquid inlet;
   the base sleeve is sheathed on the cartridge; the cartridge comprises a joint pin adapted to connect to the mouthpiece; the seal ring is sheathed on the joint pin of the cartridge;
   the silicone seal is disposed on the cartridge; the rotatable cover is rotatably disposed on the cartridge and covers the silicone seal.

2. The electronic cigarette of claim 1, wherein: the pneumatic switch is disposed in a first position of the cartridge, the e-liquid tank is disposed in a second position of the cartridge, and the first position is not vertically aligned with the second position.

\* \* \* \* \*